United States Patent [19]

Beal et al.

[11] Patent Number: 4,729,930
[45] Date of Patent: Mar. 8, 1988

[54] AUGMENTED AIR SUPPLY FOR FUEL CELL POWER PLANT DURING TRANSIENT LOAD INCREASES

[75] Inventors: Daniel W. Beal, East Hartford; Glenn W. Scheffler, Tolland, both of Conn.

[73] Assignee: International Fuel Cells Corporation, South Windsor, Conn.

[21] Appl. No.: 55,570

[22] Filed: May 29, 1987

[51] Int. Cl.⁴ .................................................. H01M 8/04
[52] U.S. Cl. ........................................... 429/13; 429/23
[58] Field of Search ...................................... 429/13, 23

[56] References Cited

U.S. PATENT DOCUMENTS

| 3,462,308 | 8/1969 | Winters | 429/17 |
| 3,576,677 | 4/1971 | Keating et al. | 429/23 |
| 4,693,945 | 9/1987 | Ohyauchi et al. | 429/21 |

FOREIGN PATENT DOCUMENTS

| 60-91569 | 5/1985 | Japan | 429/23 |
| 60-91568 | 5/1985 | Japan | 429/23 |
| 60-216467 | 10/1985 | Japan | 429/23 |
| 60-241666 | 11/1985 | Japan | 429/23 |

*Primary Examiner*—Aaron Weisstuch
*Attorney, Agent, or Firm*—William W. Jones

[57] ABSTRACT

The performance of fuel cell power plants using air as the oxygen source is reduced during periods of load increase because the response of the fuel cells to the load change is relatively instantaneous. While cell response is instantaneous, changes in air supply are not. In order to temporarily increase the air supply to the cells during such a load change, auxiliary solenoid operated valves having high response characteristics are opened to allow greater air flow to the cells. When the oxygen flow rate is determined to be sufficient for the measured load, the auxiliary valves are closed.

6 Claims, 3 Drawing Figures

AUGMENTED AIR SUPPLY FOR FUEL CELL POWER PLANT DURING TRANSIENT LOAD INCREASES

TECHNICAL FIELD

This invention relates to fuel cell power plants, and specifically to fuel cell power plants which provide increased air flow to the cells during increased power transitions.

BACKGROUND ART

Fuel cell power systems which utilize air as an oxygen source such as disclosed in U.S. Pat. No. 3,576,677 to Keating, Jr., et al. will typically supply the air with a constant air supply blower having a modulated outlet control valve to maintain optimum oxygen utilization in the cells, thereby permitting water recovery and good cell performance. The modulated valve will generally be a relatively slow motorized valve. For the vast majority of operating conditions, such an oxygen supply system is perfectly adequate. An exception can occur, however, when increased power load demands are imposed on the cells. One of the positive aspects of fuel cell power plant systems is that they are substantially instantaneous in responding to demands in increased current output or load. When an increase in load is met by a fuel cell power plant, a concurrent and equally quick increase in reactant supply should also occur to ensure proper operation of the fuel cell power plant. This is especially true for large scale increases in power output. This relatively instantaneous increase in oxygen supply will not occur with the prior art motorized modulated air supply valve because this type of valve is incapable of such quick changes in its capacity, especially in large size butterfly valves. It can take the conventional motorized modulating valve a number of seconds to adjust its feed rate to a new higher rate required because of an increase in load imposed on the power plant. During this interval, oxygen starvation can occur causing unstable operating conditions. Reduced cell voltage, increased current, fuel starvation and anode corrosion can result. The power plant will fail to produce the power demanded and may shut down due to out of limits conditions.

DISCLOSURE OF INVENTION

This invention provides for improved cell performance during periods of power output increases by incorporating a plurality of auxiliary air supply valves in parallel lines from the blower to the oxygen inlet side of the cell stack, which parallel lines bypass the modulating valve. The auxiliary valves are fast acting solenoid valves, typically operating in about 100 milliseconds after being energized. These valves are normally closed during operation of the power plant, and open for transient periods of time, only on command. Operation of the power plant is preferably controlled by a microprocessor. A current sensor connected to the microprocessor control is operable to monitor the power output of the power section. The microprocessor controls both the modulating valve and the solenoid valves. When an increase in power output is detected and relayed to the microprocessor, the latter opens a set of the solenoid auxiliary valves and also signals the modulating valve to adjust to allow more air into the power section. The microprocessor is programmed to close the auxiliary valves once the modulating valve has opened to the degree required by the magnitude of the sensed power output increase. There will preferably be more than one auxiliary valve set to provide for markedly increased air flow in the event that the load increase is excessive.

It is therefore an object of this invention to provide an improved fuel cell power plant with safeguards against oxygen starvation occurring when increases in power output are imposed upon the cells.

It is another object of this invention to provide a power plant of the character described which operates with a constant output pressurized air blower to provide air to the fuel cells through a primary variable flow rate valve.

It is an additional object of this invention to provide a power plant of the character described wherein auxiliary air is supplied to the cells subsequent to an increase in power output of the plant.

It is a further object of this invention to provide a power plant of the character described wherein the supply of auxiliary air is terminated after adjustment of the primary variable flow rate valve is completed.

It is yet another object of this invention to provide a power plant of the character described wherein the primary and auxiliary air valves are controlled by a microprocessor which reacts to input from a current sensor monitoring the load on the fuel cells.

These and other objects and advantages of the invention will become more readily apparent from the following detailed description of a preferred embodiment of the invention when taken in conjunction with the accompanying drawings.

BEST MODE FOR CARRYING OUT THE INVENTION

Figure 1:
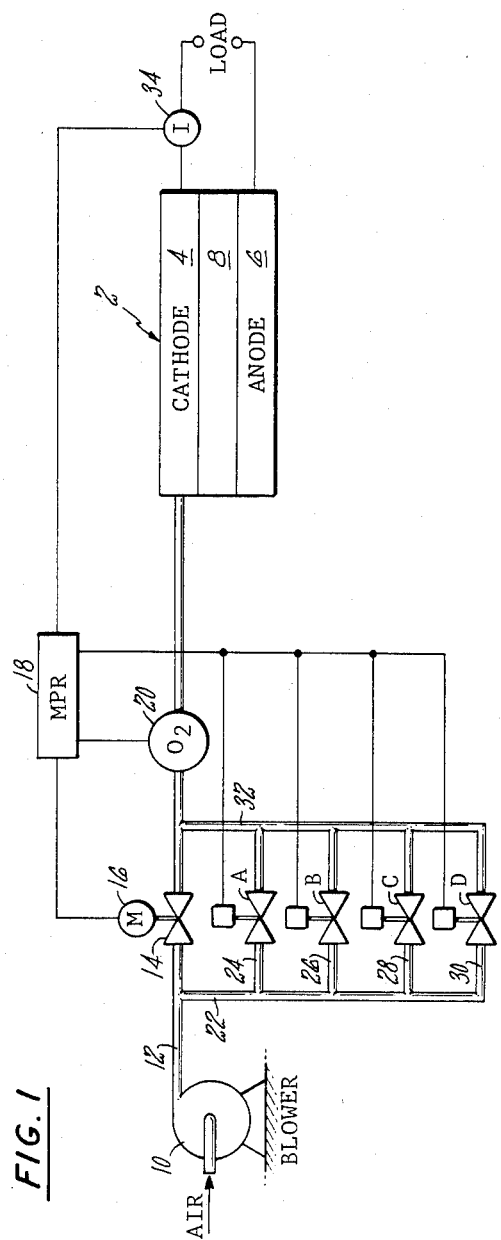
FIG. 1 is a schematic diagram of a portion of a preferred embodiment of a fuel cell power plant formed in accordance with this invention.

Referring now to FIG. 1, there is shown in schematic form, the air supply portion and power section of a fuel cell power plant which operates in accordance with this invention. The power section, denoted generally by the numeral 2, includes a cathode side 4, an anode side 6 and and an intermediate electrolyte matrix portion 8. While the power section 2 is shown in the schematic diagram as a single fuel cell, it will be readily appreciated that the power section will actually typically comprise one or more stacks of fuel cells. Oxygen is supplied to the cathode side 4 of the power section 2 by a constant speed blower 10 which blows ambient air into the cathode side via air conduit 12. A primary air flow control valve 14 is mounted in the cathode inlet air conduit 12, the valve 14 being a modulated valve which is operated by fixed rate motor 16, which, in turn, is controlled by the power plant microprocessor control 18. The control 18 is thus able to adjust the rate at which air flow through the valve 14 by selectively operating the motor 16. A flow meter 20 is mounted in the conduit 12 between the primary control valve 14 and the cathode side 4 of the power section 2 to monitor the flow rate of oxygen entering the cathode. The flow meter 20 is preferably a solid state mass flow meter, and is also operably connected to the power plant microprocessor control 18.

Upstream of the primary air flow control valve 14, between the latter and the blower 10, there is disposed a first branch air conduit 22 which leads to flow bypass conduits 24, 26, 28, and 30. Each of the bypass conduits 24, 26, 28, and 30 has mounted therein a solenoid valve A, B, C, and D, respectively. The solenoid valves A, B, C, and D are quick opening valves which are either fully closed or fully open, and are normally biased closed during operation of the power plant. The solenoid valves A, B, C, and D are operably connected to the power plant microprocessor control 18, and are selectively operated thereby, as will be set forth in greater detail hereinafter. The bypass conduits 24, 26, 28, and 30 are connected to a second branch conduit 32 which reenters the oxygen inlet conduit 12 downstream of the primary air flow control valve 14. A current or load monitor 34 is connected to the power plant production circuit to monitor the current being produced by the power section 2. The current monitor 34 is also operably connected to the power plant microprocessor control 18.

Figure 2:
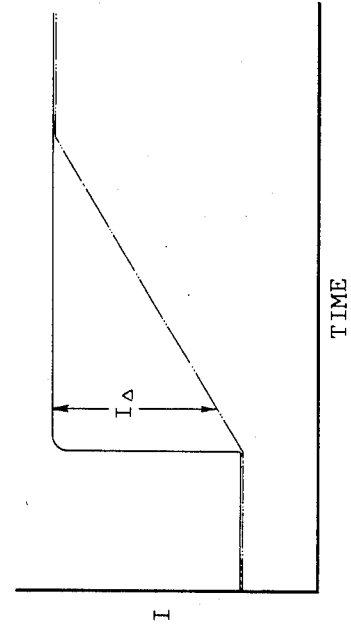
FIG. 2 is a graphic representation of the manner in which actual load changes occur in the power plant and the manner in which oxygen flow changes in response to modulation of the motorized air flow valve.

Referring now to FIG. 2, a graphic representation of output current demand, or load, is shown for the power section during a transient increase, and also during opening of the motorized primary control valve 14. In FIG. 2, the Y axis denotes load or current I in amps, and the X axis denotes time T. The solid line indicates a change in load during a power demand transient increase, and the phantom line denotes theoretical current production change or power delivered as a result of increased oxygen flow to the cathode due to opening of the motorized valve. Since the changes in load occur substantially instantaneously while the changes in oxygen flow increase steadily at a fixed rate so long as the motorized control valve is being opened, there will be a difference in load current demand and theoretical current produced by available oxygen from the motorized control valve, this difference being denoted by I$\Delta$ in FIG. 2. It will be seen that I$\Delta$ will steadily decrease as the motorized valve opens until the oxygen flow rate through the motorized valve is sufficient to supply the load current demand. It is during time periods when there exists an I$\Delta$ that risk of oxygen starvation and performance deficit is present. The greater the I$\Delta$ when the load transient increase occurs, the longer time it will take the oxygen flow rate through the motorized valve to catch up, and the greater the danger of cell damage.

The microprocessor control 18 is constantly fed information from the flow meter 20 so that the microprocessor control 18 always knows the existing setting of the motorized control valve 14. Likewise, the control 18 is preprogrammed to know the fixed rate at which the control valve 14 opens and closes. The current output monitor 34 constantly feeds information to the control 18 as to the existing load imposed on the power section 2. Whenever the imposed load increases, the control 18 can calculate the time needed for opening the control valve 14 until the control valve 14 will reach a setting that will satisfy the increased load with oxygen flowing through the valve 14. The control 18 is preprogrammed to selectively open some or all of the auxiliary solenoid valves A, B, C, and D upon detecting an I$\Delta$ value which is above one or more preselected values, and is also preprogrammed to selectively close the solenoid valves A, B, C, and D when the I$\Delta$ drops below one or more lower preselected values. The preselected opening I$\Delta$ values are such that the power section 2 will not risk damage from relying solely on the motorized valve 14 when presented with initial I$\Delta$ values that are less than the preselected opening I$\Delta$ values. The preselected closing I$\Delta$ values are low enough to ensure that the solenoid valves will not be constantly opening and closing, and thus incurring wear, simply because I$\Delta$ fluctuates near the preselected I$\Delta$ opening values during operation of the system. If the control 18 is fed and I$\Delta$ value from the output monitor 34 which does not exceed the lower preprogrammed opening I$\Delta$ value, then the control 18 will calculate the time needed to open the motorized valve 14 to meet the new I$\Delta$, and will then open the motorized valve for that calculated time period.

Figure 3:
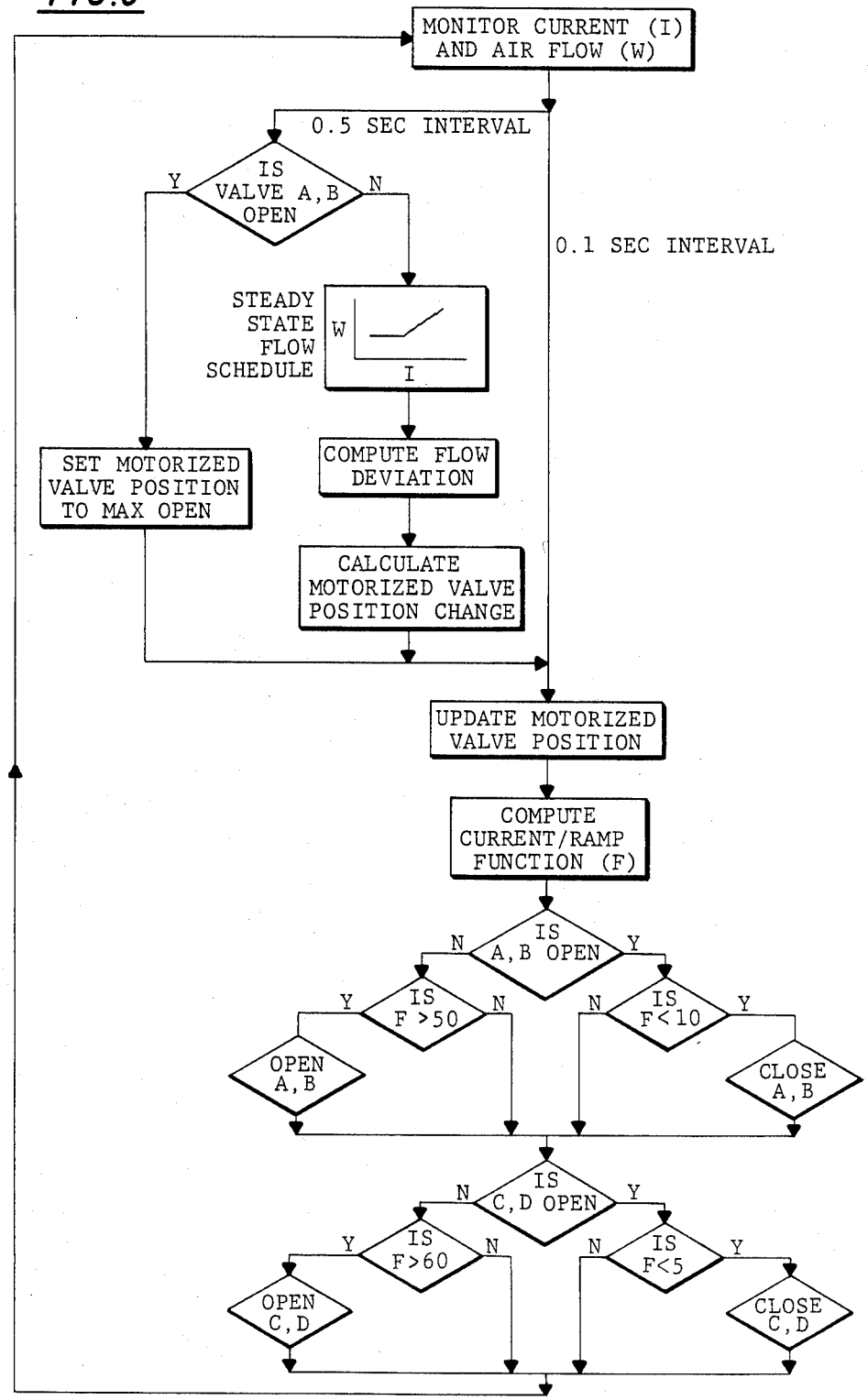
FIG. 3 is a software flow chart outlining the manner in which the microprocessor control for the power plant controls the solenoid valves and the primary air flow control valve.

Referring now to FIG. 3, there is shown a software flow chart which describes operation of the microprocessor control 18, and the valves 14, as well as the solenoid valves A, B, C, and D. In the system shown in FIG. 3, the solenoid valves are operated as pairs, so that valves A and B will open and close together, and valves C and D will also open and close together. This mode of operation is merely one of many modes in which the invention can be used, and was selected primarily because of the sizes of commercially available solenoid valves. Also, in the system described in FIG. 3, the valve pair A and B open and close first, while the valve pair C and D open and close second. This means merely that if the I$\Delta$ measured is such that only two solenoid valves are needed to augment the motorized valve, then A and B will be opened and C and D will remain closed. In the procedure outlined in FIG. 3, it will be noted that the microprocessor checks the condition of the initial solenoid valves A and B at half second intervals and adjusts the motorized valve accordingly. If, in these half second sweeps, the solenoid valves A and B are found to be closed, the control compares the oxygen flow rate schedule W with the actual flow rate and adjusts the motorized valve accordingly. At one tenth of a second intervals, the control checks both valve sets A, B and C, D and checks the current/ramp function F, which is related to I$\Delta$, and decides whether A, B and C, D should be opened or closed. It is noted that the valves A and B are checked first and properly adjusted, whereafter the valves C and D are checked and properly adjusted. It will also be noted that the half second sweeps are followed by the tenth of a second check of the solenoid valves.

It will be readily understood that the system of this invention is simple to install and automatically operable by appropriately programming a microprocessor power plant control system. Oxygen starvation during transient load increases is prevented, but the cells are not fed excessive amounts of oxygen for long periods of time diluting the power plant exhaust so that the recovery of product water is not adversely affected. The hardware used to construct the system of this invention is commercially available so that the system is relatively economical to construct. In addition, existing systems can be readily retrofitted to operate in accordance with this invention.

Since many changes and variations of this disclosed embodiment of the invention may be made without departing from the inventive concept, it is not intended to limit the invention otherwise than as required by the appended claims.

What is claimed is:

1. In a fuel cell power plant, a system for supplying air to an oxygen side of the cells in the plant, said system comprising:
   (a) conduit means for feeding air to said oxygen side of said plant;
   (b) a constant speed blower connected to said conduit means for blowing an air stream into said conduit means at a constant velocity;
   (c) a motorized control valve in said conduit means between said blower and said oxygen side, said control valve being adjustable to vary the amount of air flowing to said oxygen side;
   (d) branch conduit means opening into said conduit means for providing an air flow path from said blower to said oxygen side which bypasses said control valve;
   (e) fast acting valve means in said branch conduit means, said fast acting valve means being relatively instantly transformable from a closed condition to an open condition and return, and said fast acting valve means being normally in said closed condition;
   (f) flow meter means in said conduit means for measuring amounts of oxygen flowing from said control valve and said fast acting valve means to said oxygen side;
   (g) current monitoring means connected to a loaf line from the power plant for monitoring load changes imposed upon the cells in the power plant; and
   (h) microprocessor means for controlling operation of said system, said microprocessor means being operably connected to said current monitoring means, to said flow meter means, to said fast acting valve means, and to said control valve, said microprocessor means being operable to:
      (i) receive load and oxygen flow data from said monitoring and sensor means respectively;
      (ii) continually determine if said control valve is capable of providing sufficient oxygen to satisfy existing load demands;
      (iii) open said control valve incrementally when said control valve can independently provide increased oxygen in a timely manner responsive to increased load demand; and
      (iv) open said fast acting valve means and simultaneously open said control valve in continued fashion, when said control valve cannot independently provide increased oxygen in a timely manner responsive to increased load demand, whereby the power plant will not suffer from oxygen starvation during transient increases in load demand.

2. The fuel cell power plant system of claim 1 wherein said microprocessor means is further operable to close said fast acting valve means when existing oxygen flow rate from said fast acting valve means and said control valve reaches a previously inputted value which is a precalculated amount capable of supporting the concurrently existing load demand.

3. The fuel cell power plant system of claim 1 wherein said fast acting valve means comprises a plurality of solenoid valves, and wherein said microprocessor means is operable to open less than all of said solenoid valves when oxygen supply shortfall from said control valve is a smaller first precalculated amount less than that required to support ongoing load demand, and is further operable to open all of said solenoid valves when oxygen supply shortfall from said control valve is a second larger amount less than that required to support ongoing load demand.

4. A method for supplying oxygen to a fuel cell system during extended operating periods, said method comprising the steps of:
   (a) continuously monitoring load demand imposed on said fuel cell system;
   (b) continuously monitoring oxygen flow rate into said fuel cell system;
   (c) periodically comparing measured loads and measured oxygen flow rates with a precalculated steady state flow schedule and comparing measured oxygen flow rate deviations from said steady state flow schedule;
   (d) gradually increasing the oxygen flow rates to the fuel cell system when said measured oxygen flow rate deviations are less than a first predetermined value; and
   (e) simultaneously substantially instantaneously providing augmented oxygen flow to increase the oxygen flow rates to the fuel cell system when said oxygen flow rate deviations exceed said first predetermined value.

5. The method of claim 4 further comprising the step of substantially instantaneously terminating the augmented oxygen flow when said oxygen flow rate deviations are below a second predetermined value which second predetermined value is less than said first predetermined value.

6. The method of claim 5 further comprising the step of continuing to gradually increase the oxygen flow rates after terminating the augmented oxygen flow, until such time as the measured oxygen flow rates conform to the precalculated steady state flow schedule, and thereafter providing a steady flow of oxygen.

* * * * *